Feb. 9, 1937. O. M. DAVIS 2,070,077
COUPLING
Filed April 17, 1935 2 Sheets-Sheet 2
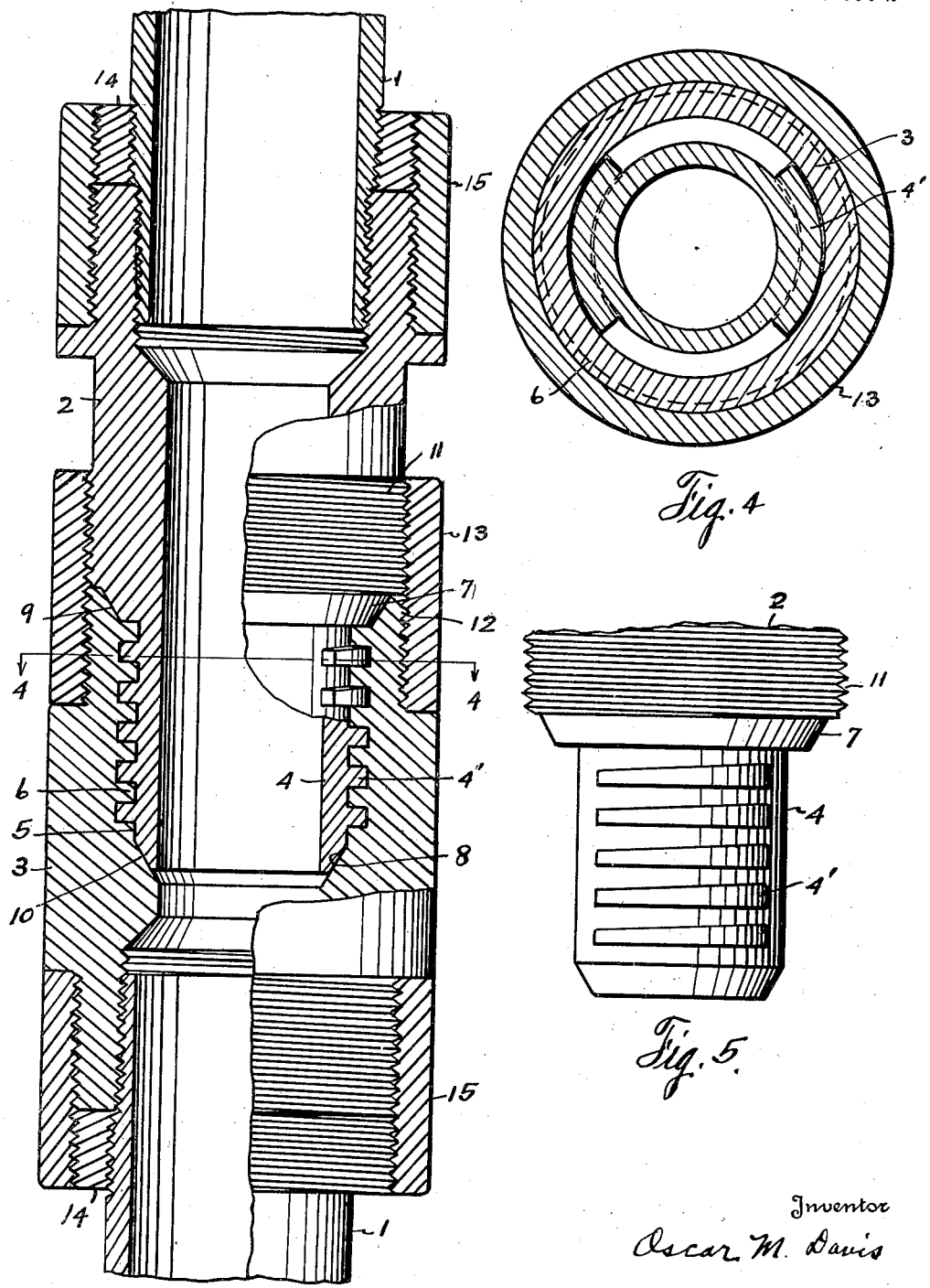

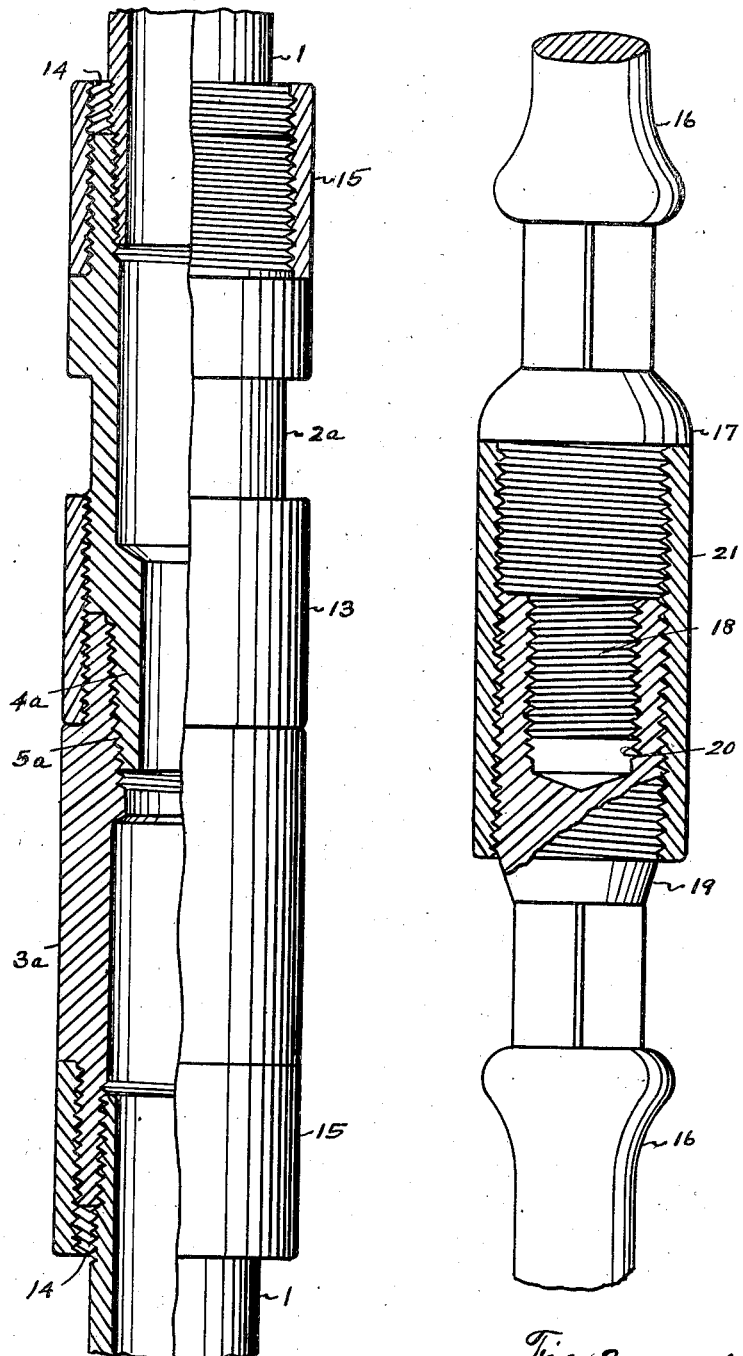

Patented Feb. 9, 1937

2,070,077

UNITED STATES PATENT OFFICE 2,070,077

COUPLING

Oscar M. Davis, Houston, Tex.

Application April 17, 1935, Serial No. 16,857

2 Claims. (Cl. 285—146)

This invention relates to a coupling and has particular relation to a coupling for two members, one having an internally threaded box, and the other an externally threaded pin adapted to be screwed into said box with means for locking the connected parts to prevent the unscrewing and separation of them.

An object of the invention is to provide a coupling especially designed for connecting rod or pipe sections, and for locking them against separation, and applicable generally to a coupling wherein the parts are connected by threads.

Another object of the invention is to provide a coupling embodying male and female members connected by threads, and having annular abutting faces which will be drawn closely together when the parts are screwed home to prevent leakage through the joint.

The invention is primarily intended for use in connecting sections of sucker rods and pipes.

With the above and other objects in view, the invention has particular relation to certain novel features of construction, arrangement of parts, and use, examples of which are given in this specification and illustrated in the accompanying drawings, wherein:

Figure 1 shows a side view, partly in section, illustrating the invention as applied to a tool joint for connecting pipe sections.

Figure 2 shows a side elevation, partly in section, of a coupling connecting sucker rod sections, and embodying the invention.

Figure 3 shows a side view, partly in section, of a modified form of the invention as applied to a tool joint.

Figure 4 shows a transverse sectional view thereof taken on the line 4—4 of Figure 3, and Figure 5 shows a side view of the pin member of a modified form of a tool joint.

In the drawings, the numerals 1, 1, designate sections of pipe to be connected. A tubular pin member 2 is attached by threads to the end of one of said sections and the box member 3 is connected in a similar manner to the other pipe section. The pin member 2 has a reduced pin 4 shaped to fit into the box 5 of the member 3. The pin 4 has the external mutilated threads 4' and the box member has similar mutilated threads 6 adapted to intermesh with the threads 4' when the pin is inserted into the box and turned. The upper sides of the threads 4' are pitched in a corresponding direction, and the under sides of the threads 6 are correspondingly pitched in a direction the reverse of that of the threads 4'. The pin member has the external downwardly and inwardly tapering faces 7 and 8, and the box member has the corresponding upwardly flared faces 9 and 10. When the pin is inserted into the box, the faces 7, 8, will land on the corresponding faces 9, 10, and when the pin is appropriately turned, the corresponding sloping faces of the threads 4', 6, will ride against each other, and draw said contacting faces closely together. The pin member has the external threads 11, and the adjacent end of the box member has the external threads 12, said threads 11 and 12 being correspondingly pitched and being pitched in a direction the reverse of that of the pitch of the threads 4', 6.

There is an externally threaded coupling sleeve 13 threaded on to the pin member 2 and adapted to be also screwed onto the box member when the parts are assembled. The externally threaded portion of the box member is preferably reduced in diameter, externally, so that the external surfaces of the coupling sleeve and box member will be flush.

In connecting the members of the tool joint, the coupling sleeve 13 is screwed up on to the pin member 2 until its outer, or lower end, is withdrawn clear of the tapering face 7 and the pin 4 is then inserted into the box 5 in such position that the threads 4' will clear the threads 6 and when the pin is fully inserted so that the faces 7, 8, are seated on the faces 9, 10, the pin member is then given a quarter turn in an appropriate direction so that the threads 4' will wedge between the threads 6, and their contacting tapering faces will draw said seats closely together. The coupling sleeve 13 is then screwed on to the box member in position to break the joint between the pin and box members, and this coupling sleeve will serve to prevent the relative reverse rotation of the pin and box members by reason of the fact that the threads 11, 12, are pitched in a direction the reverse of that of the threads 4', 6, so that the tool joint members will not be liable to become accidentally unscrewed and separated while in a well. When it is desired to separate these members, however, the coupling sleeve can be unscrewed from the box member and the tool joint members then separated in an obvious manner.

In the form shown in Figure 1, the pin member 2a has the conventional tapering pin 4a, and the box member 3a has the conventional internal threaded box 5a to receive said pin. In this form the coupling sleeve 13 is employed as in the form shown in Figure 3, the threads of the pin and box being pitched in a direction the reverse of that of the threads whereby the coupling sleeve is connected to the pin and box members so that when the parts are connected, and the coupling sleeve 13 is screwed home, the pin 4a will be locked against reverse rotation in the box 5a. In other respects than those mentioned, the construction disclosed in Figure 1 is the same as that disclosed in Figure 3.

The pipe sections 1, 1, are screwed into the outer ends of the respective pin and box members, and ring nuts 14, 14, are screwed on to said pipe sections and abut the adjacent ends of the respective pin and box members when the parts are assembled. The outer ends of the pin and box members are externally reduced in diameter and said reduced ends, as well as the adjacent ring nuts 14, are correspondingly externally threaded, said external threads, and the internal threads of the ring nuts being pitched in a direction the reverse of that of the internal threads which connect the corresponding coupling member to the adjacent pipe section; the ring nuts may be welded to the pipe sections if desired.

The coupling sleeves 15 are provided, when the parts are assembled, as shown, with the section 1 screwed into the corresponding tool joint member and with the coupling sleeve 15 screwed home, as shown in a position to break the joint between the ring nut 14 and the adjacent coupling member. These connected parts will be locked against reverse rotation on account of the opposite pitch of said threads. If it be desired to separate the parts, the coupling sleeve 15 may be unscrewed, on the nut 14, until it clears the outer end of the corresponding tool joint member and the pipe section 1 may then be unscrewed from said tool joint member in the usual way.

In Figure 2 a sucker rod coupling has been shown connecting adjacent sucker rod sections 16, 16. One of these sections has the pin member 17 provided with the externally threaded pin 18 and the other section has the box member 19 provided with the internally threaded box 20. The pin and box members are externally threaded to receive a coupling sleeve 21. The external threads are pitched in a direction the opposite of the threads connecting the pin 18, with the box 20, and when the pin 18 is threaded into said box and the coupling sleeve 21 is screwed home, as shown in Figure 2, the parts will be locked against accidental unscrewing on account of the reverse pitch of the connecting threads.

It it be desired to separate the coupling, the sleeve 21 may be unscrewed until it clears the end of the box member 19 and the pin 18 may then be readily unscrewed from the box 20.

The drawings and description disclose what are now considered to be preferred forms of the invention by way of illustration only, while the broad principle of the invention will be defined by the appended claims.

What I claim is:—

1. A coupling comprising two members whose adjacent ends are threaded, one into the other, a ring nut threaded on to one member, a sleeve threaded onto said ring nut and onto the other member, the threads connecting said members being pitched in a direction the opposite of that of the threads connecting the sleeve to said ring nut and the other member.

2. A coupling comprising two coupling members whose outer ends are internally threaded to receive the adjacent ends of sections to be connected, the adjacent ends of said coupling members being threaded, one into the other, an external sleeve threaded on to both coupling members by means of threads which are pitched in a direction the opposite of that of the threads connecting said members, ring-nuts threaded onto the connected sections, sleeves threaded onto the ring-nuts and onto the adjacent ends of the corresponding coupling members, the outer ends of the coupling members and the adjacent ring-nuts being correspondingly externally threaded, said external threads and the internal threads of the ring-nuts being pitched in a direction the reverse of that of the internal threads which connect the corresponding coupling members to the adjacent connected sections.

OSCAR M. DAVIS.